(12) United States Patent
Eshel et al.

(10) Patent No.: US 9,826,180 B2
(45) Date of Patent: Nov. 21, 2017

(54) SAMPLE-AND-HOLD CIRCUIT WITH BLACK SUN CONTROL

(71) Applicant: Sony Semiconductor Solutions Corporation, Kanagawa (JP)

(72) Inventors: Noam Eshel, Pardesia (IL); Golan Zeituni, Kfar-Saba (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/928,551

(22) Filed: Oct. 30, 2015

(65) Prior Publication Data

US 2017/0126998 A1   May 4, 2017

(51) Int. Cl.
| | | |
|---|---|---|
| *H04N 9/64* | (2006.01) | |
| *H04N 5/359* | (2011.01) | |
| *H04N 5/217* | (2011.01) | |
| *H04N 5/357* | (2011.01) | |
| *H04N 5/378* | (2011.01) | |

(52) U.S. Cl.
CPC ......... *H04N 5/3598* (2013.01); *H04N 5/2173* (2013.01); *H04N 5/3575* (2013.01); *H04N 5/378* (2013.01)

(58) Field of Classification Search
None
See application file for complete search history.

(56) References Cited

U.S. PATENT DOCUMENTS

| | | | | | |
|---|---|---|---|---|---|
| 5,886,659 | A  * | 3/1999 | Pain | ....................... | H04N 3/155 341/144 |
| 6,803,958 | B1 * | 10/2004 | Wang | ..................... | H04N 5/243 348/308 |
| 6,873,363 | B1 * | 3/2005 | Barna | .................... | H04N 5/378 348/308 |
| 7,397,505 | B2 * | 7/2008 | Brehmer | ................ | H04N 5/243 348/243 |
| 7,710,471 | B2 * | 5/2010 | Takayanagi | .......... | H04N 5/3598 348/241 |
| 9,525,837 | B1 * | 12/2016 | Eshel | ...................... | H04N 5/378 |
| 2005/0195033 | A1 * | 9/2005 | Sakurai | ............... | H03F 3/45197 330/253 |
| 2005/0225653 | A1 * | 10/2005 | Masuyama | .......... | H04N 5/3598 348/241 |
| 2006/0170803 | A1 * | 8/2006 | Lim | ....................... | H04N 5/243 348/308 |
| 2008/0237448 | A1 * | 10/2008 | Simony | ................ | H04N 5/3598 250/208.1 |

(Continued)

Primary Examiner — James Hannett
Assistant Examiner — Wesley Chiu
(74) *Attorney, Agent, or Firm* — Michael Best & Friedrich LLP

(57) ABSTRACT

An image processing circuit comprises a first sample-and-hold circuit that samples a first data from a pixel; a second sample-and-hold circuit that samples a second data from the pixel; a voltage-to-current circuit that includes a resistor and a current source, and receives the first data and the second data to output a difference data; and a black sun spot determination circuit. The black sun spot determination circuit compares a first VSL level at a first time with a second VSL level at a second time, both from the second sample-and-hold circuit, and determines the presence of a black sun spot based on a difference between the first and second level.

17 Claims, 9 Drawing Sheets

(56) References Cited

U.S. PATENT DOCUMENTS

| | | | | |
|---|---|---|---|---|
| 2010/0321551 A1* | 12/2010 | Rysinski | .............. | H04N 5/3598 |
| | | | | 348/308 |
| 2012/0249851 A1* | 10/2012 | Martinussen | .......... | H04N 5/378 |
| | | | | 348/308 |
| 2017/0127002 A1* | 5/2017 | Eshel | ................... | H04N 5/3575 |

* cited by examiner

SAMPLE-AND-HOLD CIRCUIT WITH BLACK SUN CONTROL

BACKGROUND OF THE INVENTION

1. Field of the Invention

This application relates generally to sample-and-hold circuits. More specifically, this application relates to a sample-and-hold circuit that is capable of detecting and controlling strong incoming illumination in an image sensor.

2. Description of Related Art

Image sensing devices typically consist of an image sensor, generally an array of pixel circuits, as well as signal processing circuitry and any associated control or timing circuitry. Within the image sensor itself, charge is collected in a photoelectric conversion device of the pixel circuit as a result of the impingement of light.

One example of a pixel circuit is illustrated in FIG. 1. As shown in FIG. 1, a pixel circuit 100 includes a photoelectric conversion device 101 (for example, a photodiode), a floating diffusion FD, a transfer transistor 102, a reset transistor 103, an amplification transistor 104, and a selection transistor 105, and a vertical signal line 106. As illustrated, vertical signal line 106 is common to a plurality of pixel circuits within the same column. Alternatively, a vertical signal line may be shared among multiple columns. Gate electrodes of transfer transistor 102, reset transistor 103, and selection transistor 105 receive signals TRG, RST, and SEL, respectively. These signals may, for example, be provided by the control or timing circuitry.

While FIG. 1 illustrates a pixel circuit having four transistors in a particular configuration, the current disclosure is not so limited and may apply to a pixel circuit having fewer or more transistors as well as other elements, such as capacitors, resistors, and the like. Additionally, the current disclosure may be extended to configurations where one or more transistors are shared among multiple photoelectric conversion devices.

The voltage at signal line 106 is measured at two different times under the control of timing circuits and switches, which results in a reset signal ("P-phase value") and light-exposed or data signal ("D-phase value") of the pixel. This process is referred to as a correlated double sampling (CDS) method. The reset signal is then subtracted from the data signal to produce a value which is representative of an accumulated charge in the pixel, and thus the amount of light shining on the pixel. The accumulated charge is then converted to a digital value. Such a conversion typically requires several circuit components such as sample-and-hold (S/H) circuits, analog-to-digital converters (ADC), and timing and control circuits, with each circuit component serving a purpose in the conversion. For example, the purpose of the S/H circuit may be to sample the analog signals from different time phases of the photo diode operation, after which the analog signals may be converted to digital form by the ADC. A single-slope ADC is illustrated in FIG. 1, including a comparator 110, a digital counter 120, and a ramp reference voltage $V_{ramp}$.

FIG. 2 illustrates a waveform and timing diagram for the different timing phases in acquiring the reset and data signals from a pixel, as well as an example of the voltage VSL during different phases. In FIG. 2, the solid line illustrates a VSL signal when the incoming illumination is at a "normal" level; that is, within the typical range of operation of the pixel under suitable exposure control. As illustrated, the voltage VSL is a result of the photodiode collecting negative charges when it is exposed to light; thus, the lower normal signal indicates a higher illumination than the upper normal signal in FIG. 2.

As illustrated by the solid lines in FIG. 2, VSL settles to a steady voltage after the pixel has been reset. Then, in the above example where a single-slope ADC is used, the ADC measures the voltage VSL beginning with the start of the "reset noise integration" period. During this measurement, $V_{ramp}$ begins at a high level and then decreases linearly as a function of time from this initial high level. Simultaneously, the digital counter starts counting from zero while monitoring the output of the comparator so as to stop counting when the comparator changes state. At this point, the stopped count value is a digital value corresponding to the reset signal of the pixel. The data signal value of the pixel is then measured in a similar fashion after the signal line VSL has once again settled; i.e., during the "data noise integration" period illustrated in FIG. 2. The difference between the data and reset values is then interpreted as the amount of illumination on the pixel.

However, if the illumination is the very strong, such as when a camera including the image sensor is pointing at the sun, this interpretation may be incorrect. This is due to two main factors. First, strong illumination may cause the photodiode to saturate, which results in charges leaking from one pixel to another. Some of this leaked charge is collected by the FD node in the neighboring pixels. This is sometimes referred to as a "blooming" effect where a bright spot in one part of an imaged scene spreads into a neighboring area of the image, causing a larger bright area in the image than in the actual scene. Second, strong illumination may cause a fraction of light on the photodiode to leak into the FD of the same pixel, which causes the floating diffusion to also act as a photodiode and generate charges in response to the leaked light. Both of these factors cause VSL to decrease with time as illustrated in the dashed and dot-dashed curves illustrated in FIG. 2. These factors are proportional to the strength of the illumination; thus, stronger illumination causes a steeper decrease in VSL.

The effect of strong illumination on VSL causes the difference between the data value and the reset value to decrease. Thus, an area with strong illumination may actually cause the output pixel value (data minus reset) to decrease, resulting in an output pixel that is interpreted as gray rather than white. When the input illumination is very strong, VSL may drop very quickly, as illustrated by the dot-dashed curve of FIG. 2. In this case, both the reset value and the data value are at the lowest possible level of the circuit operating range, and thus the difference between the data value and the reset value is zero. As a result, the output becomes black when there is very strong incoming illumination. This is referred to as the "black sun spot" problem because the resultant output image shows a black spot when the camera is directly pointing at the sun.

Thus, there exists a need for a sample-and-hold circuit that does not suffer from the black sun spot problem when the image sensor is subjected to strong illumination levels.

BRIEF SUMMARY OF THE INVENTION

Various aspects of the present disclosure relate to a sample-and-hold circuit and/or a black sun detection circuit for improving the operation of a sample-and-hold circuit.

In one aspect of the present disclosure, an image processing circuit comprises a first sample-and-hold circuit configured to sample a first data from a pixel; a second sample-and-hold circuit configured to sample a second data from the pixel; a voltage-to-current circuit including a first resistor and a current source, and configured to receive the first data and the second data and output a difference data; a black sun spot determination circuit configured to compare a first VSL level from the second sample-and-hold circuit at a first time with a second VSL level from the second sample-and-hold circuit at a second time and determine a presence of a black sun spot based on a difference between the first VSL level and the second VSL level.

In another aspect of the present disclosure, a method of processing an image comprises sampling a first data from a pixel by a first sample-and-hold circuit; sampling a second data from the pixel by a second sample-and-hold circuit; receiving the first data and the second data by a voltage-to-current circuit including a first resistor and a current source; outputting a difference data by the voltage-to-current circuit; comparing a first VSL level from the second sample-and-hold circuit at a first time with a second VSL level from the second-sample-and hold circuit at a second time by a black sun spot determination circuit; and determining a presence of a black sun spot based on a difference between the first VSL level and the second VSL level.

In yet another aspect of the present disclosure, an imaging device comprises a pixel including a photoelectric conversion device configured to convert an incident light into an analog signal; and an image processing circuit, including a first sample-and-hold circuit configured to sample a first data from the pixel; a second sample-and-hold circuit configured to sample a second data from the pixel; a voltage-to-current circuit including a first resistor and a current source, and configured to receive the first data and the second data and output a difference data; a black sun spot determination circuit configured to compare a first VSL level from the second sample-and-hold circuit at a first time with a second VSL level from the second sample-and-hold circuit at a second time and determine a presence of a black sun spot based on a difference between the first VSL level and the second VSL level.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the S/H circuits are used in image sensors, it will be understood that this is merely one example of an implementation. It will further be understood that the disclosed S/H circuits can be used in any device in which there is a need to sample a signal and/or compare two voltages; for example, an audio signal processing circuit, industrial measurement and control circuit, and so on.

In this manner, the present disclosure provides for improvements in the technical field of signal processing, as well as in the related technical fields of image sensing and image processing.

[Black Sun Spot Detection]

As noted above, when strong illumination is present, it can cause the voltage VSL to drop instead of maintaining a steady level. When the illumination is stronger, the slope of the drop is steeper. As a result, it is possible to detect very strong illumination by observing the change of the voltage VSL. For example, the change of voltage during a reset noise integration period may be measured. If this voltage change exceeds a predetermined level, it may be decided that strong illumination is present and countermeasures may be taken.

In order to measure the change in VSL, however, it is preferable to take various precautions. When the incident illumination is very strong, the drop of VSL may be very steep. Thus, it is possible that, at the beginning of the reset noise integration period (or a reset phase ADC in a single slope ADC architecture), the voltage VSL has already dropped to such a low level that a measurement of the change is rendered difficult or impossible. To remedy this problem it is preferable to incorporate a mechanism to prevent VSL from dropping to a very low value at the beginning of the reset noise integration period. For this purpose, a clamping circuit may be used.

Figure 3:
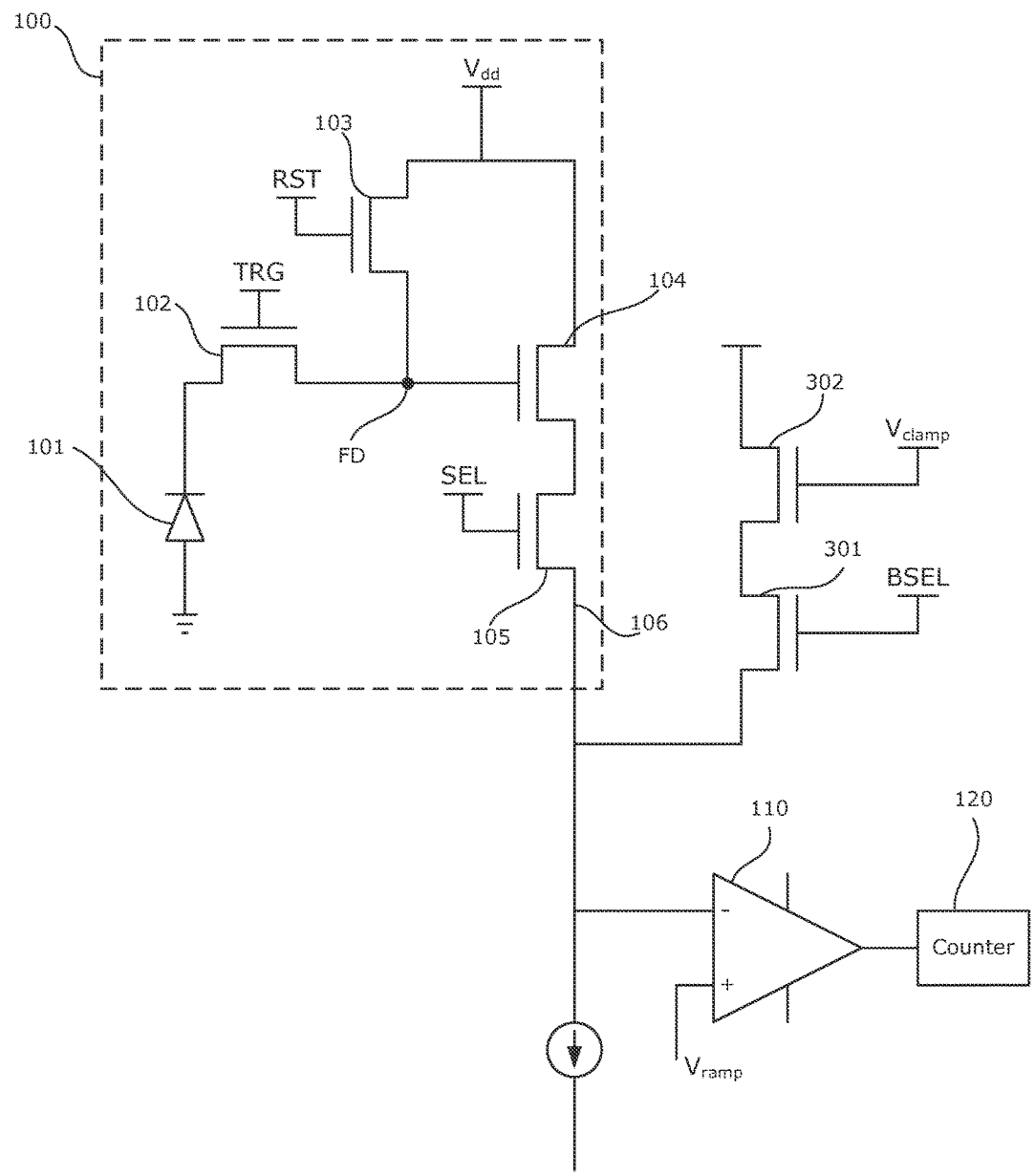
FIG. 3 illustrates an exemplary pixel circuit with ADC and clamping circuit according to various aspects of the present disclosure.

FIG. 3 illustrates a pixel circuit such as the pixel circuit 100 with an additional clamping circuit. The clamping circuit includes a select transistor 301 and a source follower (SF) transistor 302 as in a pixel circuit, but does not include a photodiode. Instead, a voltage $V_{clamp}$ is applied to the gate of SF transistor 302. The clamping circuit restricts a minimum voltage of signal line 106 (VSL). Thus, even if the signal line 106 could potentially fall to a very low level as a result of very strong illumination on photodiode 101, the clamping circuit maintains the voltage VSL to a minimum value of $VSL_{min}=V_{clamp}-V_{th302}-V_{on301}$, where $V_{th302}$ is the gate-drain voltage of SF transistor 302 and $V_{on301}$ is the source-drain voltage of select transistor 301 when it is in the on state.

The clamping circuit results in a modified VSL waveform due to the clamping. In this case, VSL does not drop to the clamp voltage $V_{clamp}$ and thus the clamping circuit does not affect the operation of the circuit. Instead, when the illumination has increased to a level that would otherwise cause VSL to drop below $V_{clamp}$, the clamping circuit pulls the voltage up and maintains VSL at the level $VSL_{min}$. The clamping circuit is activated until the end of the pixel reset/VSL settling period, and is disabled at the beginning of the "ADC of reset phase" period so that the VSL level may drop depending on the incoming illumination. Therefore, the change in VSL can be measured. When the drop of VSL exceeds a certain predetermined level, it is concluded that the incoming illumination has exceeded a certain threshold. This indicates an excessively strong illumination, which may be a result of a camera pointing at the sun, for example.

Figure 4A:
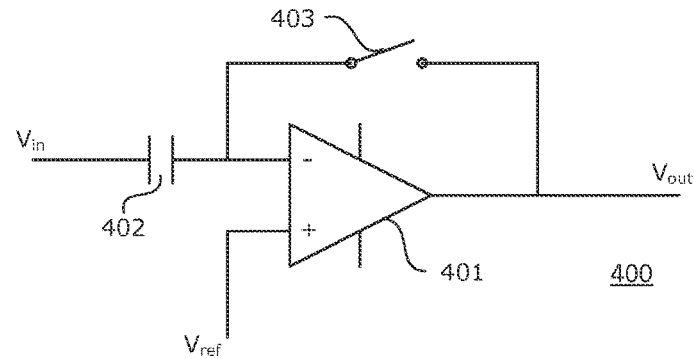
FIGS. 4A-C illustrate an exemplary switched-capacitor comparator according to various aspects of the present disclosure.
Figure 4B:
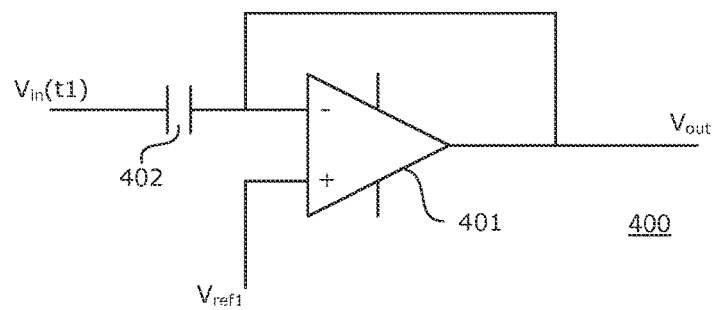
Figure 4C:
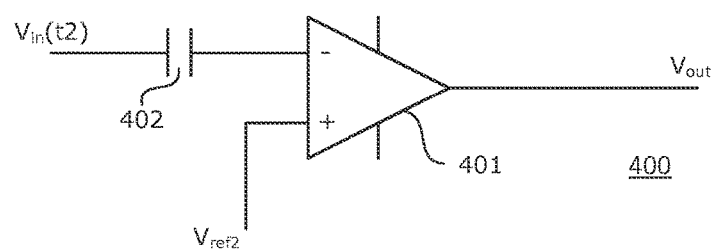

To detect the change in VSL, a switched capacitor comparator may be used. FIGS. 4A-C illustrate a switched capacitor comparator circuit 400, which includes a differential amplifier 401, a sampling capacitor 402, and a switch 403. At a time t1 illustrated in FIG. 4B, switch 402 is closed and sampling capacitor 402 is charged to a voltage of $V_{in}(t1)-V_{ref1}$. This is referred to as the "sampling phase" in the operation of switched capacitor comparator circuit 400. At a subsequent time t2 illustrated in FIG. 4C, switch 403 is opened. Because sampling capacitor 402 has been charged to the voltage $V_{in}(t1)-V_{ref1}$, the differential voltage across differential amplifier 401 is $V_{in}(t2)-V_{in}(t1)+V_{ref1}-V_{ref2}$. Therefore, if $V_{in}(t2)>V_{in}(t1)-V_{ref1}-V_{ref1}$, the output of switched capacitor comparator circuit 400 is at a low state "0". If, however, $V_{in}(t2)<V_{in}(t1)-V_{ref1}-V_{ref2}$, the output of switched capacitor comparator circuit is at a high state "1". If the reference voltage is constant (i.e., $V_{ref1}=V_{ref2}$), circuit 400 strictly compares $V_{in}$ at times t2 and t1. If, on the other hand, $V_{ref1}$ and $V_{ref2}$ are unequal, circuit 400 works similarly but with a "trip point" shifted by $V_{ref2}-V_{ref1}$.

Figure 5A:
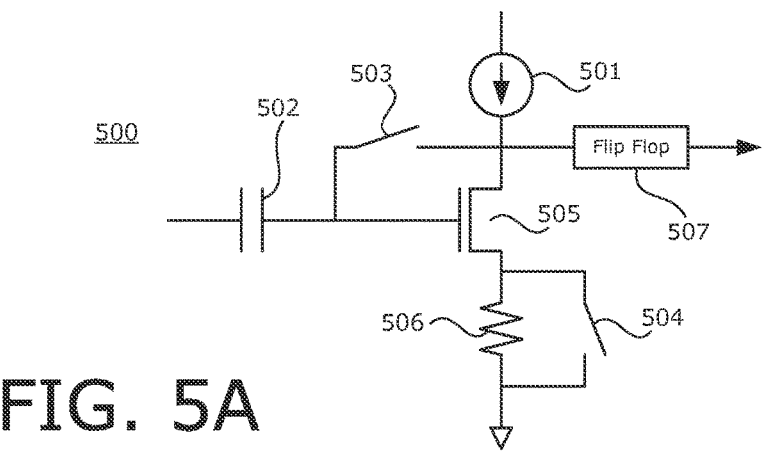
FIGS. 5A-C illustrate an exemplary shifted comparator according to various aspects of the present disclosure.
Figure 5B:
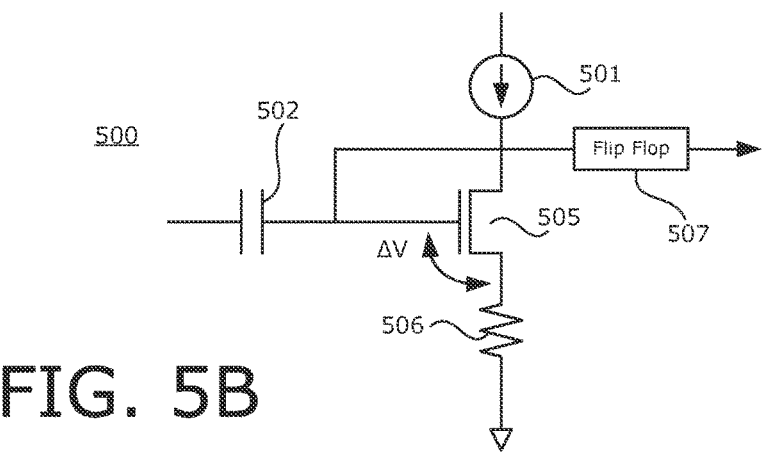
Figure 5C:
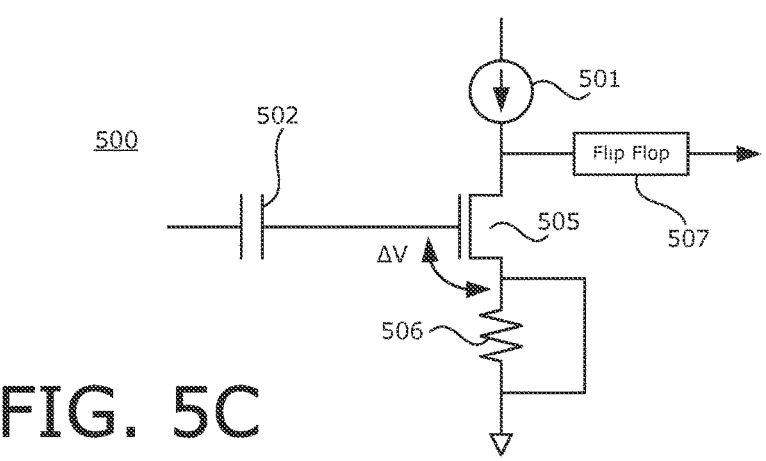

FIGS. 5A-C illustrate an implementation of a switched capacitor comparator. In this illustration, switched capacitor circuit 500 includes a current source 501 configured to output a current I, a sampling capacitor 502, switches 503 and 504, a transistor 505, a resistor 506 having resistance R, and a flip flop circuit 507 that latches the output signal and uses the latched output for black sun decision. During the sampling phase, switch 503 is closed and switch 504 is open as shown in FIG. 5B. At this time t1, sampling capacitor 502 is charged to a voltage of $V_{in}(t1)-(I\times R+\Delta V)$ where $\Delta V$ is the gate-drain voltage of transistor 505. At time t2, switch 503 is opened and switch 504 is closed as shown in FIG. 5C. Thus, if $V_{in}(t2)>V_{in}(t1)-I\times R$, transistor 505 is on and the transistor output point is at a low state. If $V_{in}(t2)<V_{in}(t1)-I\times R$, transistor 505 is off and the transistor output point, which is the input of flip flop 507, is at a high state. As a result, the trip point of switched capacitor circuit 502 is $V_{in}(t1)-I\times R$.

[Dual S/H Implementation]

Figure 6:
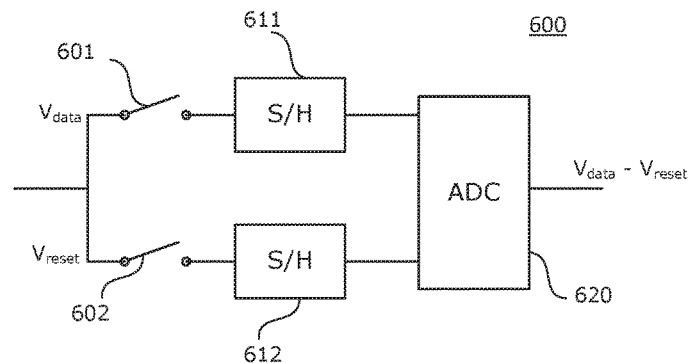
FIG. 6 illustrates an exemplary dual S/H circuit according to various aspects of the present disclosure.

To achieve sufficiently high throughput while performing CDS, the above S/H circuits may be combined in a dual S/H configuration. FIG. 6 is a block diagram of one such configuration. FIG. 6 illustrates an exemplary circuit 600 that converts the reset and data signals from a pixel into a digital form representative of $V_{data}-V_{reset}$. Exemplary circuit 600 may be, for example, the readout circuit of an image sensor pixel. Circuit 600 includes a first data path including a switch 601 and a S/H circuit 611, and a second data path including a switch 602 and a S/H circuit 612. As illustrated in FIG. 6, the first data path corresponds to data signal $V_{data}$ and the second data path corresponds to reset signal $V_{reset}$. The outputs of S/H circuits 611 and 612 are operatively connected to ADC 720, which in turn outputs the digital representation of $V_{reset}-V_{data}$.

To accomplish this, switches 601 and 602 are controlled at an appropriate timing so that S/H circuits 611 and 612 successively sample the input signal at the proper time so that $V_{data}$ and $V_{reset}$ appear at the top and bottom S/H circuits, respectively. ADC 620 converts the two voltages into digital values. Additionally, a subtraction is performed so that the appropriate output signal is obtained. This subtraction may be performed in the analog domain before analog-to-digital conversion, or may be performed in the digital domain after each signal has been individually converted to digital form.

Figure 7:
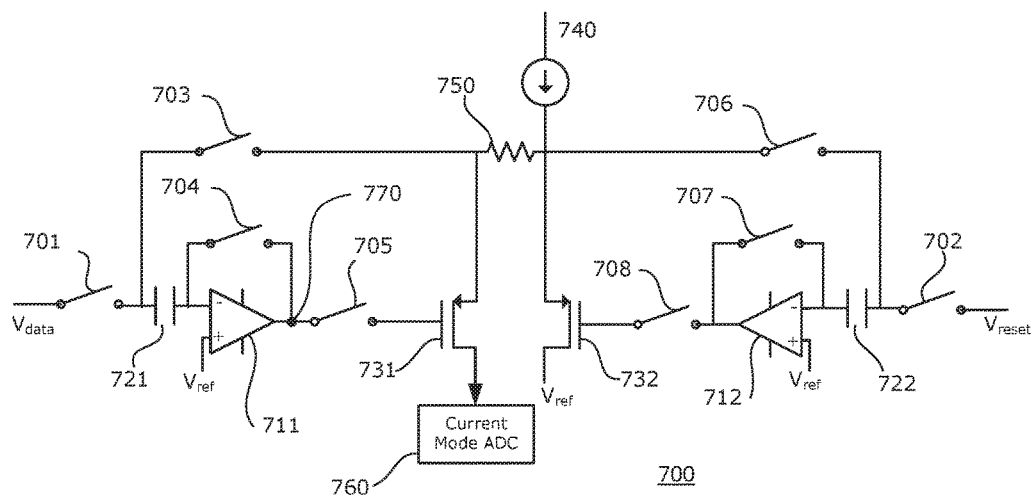
FIG. 7 illustrates an implementation of the exemplary dual S/H circuit according to FIG. 6.

FIG. 7 illustrates in more detail an exemplary dual S/H circuit 700, which may be an example of an implementation of dual S/H circuit 600. Dual S/H circuit 700 includes a left S/H circuit that samples $V_{data}$ from a pixel and a right S/H circuit that samples $V_{reset}$ from the pixel. Left S/H circuit includes switches 701, 703, 704, and 705; a differential amplifier 711; a sampling capacitor 721; and a transistor 731. Right S/H circuit includes switches 702, 706, 707, and 708; a differential amplifier 712; a sampling capacitor 722; and a transistor 732. In this manner, the two S/H inputs sample the output from the same pixel but at different timing phases to achieve CDS. Dual S/H circuit 700 also includes a current source 740 configured to output a current $I_1$, a resistor 750 having a resistance $R_1$, and a current-mode ADC 760. The output of differential amplifier 711 is an intermediate output node 770.

To sample the reset signal, switches 702 and 707 are closed, and switches 706 and 708 are opened. This causes capacitor 722 to be charged to the voltage $V_{reset}-V_{ref}$. After capacitor 722 has been charged up, switches 702 and 707 open (disconnect) to complete the sampling. To sample the data signal, a similar operation is performed. That is, switches 701 and 704 are closed, and switches 703 and 705 are opened. This causes capacitor 721 to be charged to the voltage $V_{data}-V_{ref}$. After capacitor 721 has been charged up, the switches 701 and 704 are opened.

In order to convert the difference between the reset to the data signal into current, switches 703, 705, 706, and 08 turn on. As a result the sampled reset voltage will appear on the right side of the resistor and the sampled data voltage will be on the left side of resistor 50.

Because the voltages appearing on the left and right sides of resistor 750 are $V_{data}$ and $V_{reset}$, respectively, the current that flows through resistor 750 is $I_{in}=(V_{reset}-V_{data})/R_1$. This current flows to the input of current-mode ADC 760 and is converted to a digital value. In this configuration, any type of current-mode ADC may be used; for example, a sigma-delta ADC may be used to convert the difference signal into a digital value with a high accuracy.

As can be seen from FIG. 7, the current from current source 740 is split and flows into the two transistors 731 and 732. The current flowing through transistor 731 is $I_{in}=(V_{reset}-V_{data}) R_1$, whereas the current at transistor 732 is $I_2=I_1-I_{in}$. To ensure proper operation of dual S/H circuit 700, current source 740 is chosen so that the current value $I_1$ is larger than the maximum possible value of $(V_{reset}-V_{in})/R_1$ for any $V_{reset}$ and $V_{data}$ values.

In dual S/H circuit 700, ADC 760 receives as an input the current $I_{in}=(V_{reset}-V_{data})/R_1$. This indicates that the CDS subtraction step (that is, subtracting the reset value from the light exposed signal value) is automatically done in the analog domain via the circuit arrangement. This occurs without any additional circuitry required. Another benefit to the configuration of dual S/H circuit 700 is that ADC 760 receives a scaled version of the signal difference with a scaling factor of $1/R_1$. This is equivalent to a gain in the circuit. Thus, $R_1$ may be controlled (for example, by using a variable resistor, several resistors that may be selected among, and the like) to achieve various analog gains. Thus, dual S/H circuit 700 has both CDS subtraction and analog gain capabilities built in. The output of ADC 720 is a digital value corresponding to $(V_{reset}-V_{data})/R_1$, and may include additional gain in the digital domain if desired.

To achieve black sun spot detection, the trip point of amplifier 711 may be shifted as described above. Thus, a signal present at intermediate output node 770 may be fed to a black sun detection circuit so that a determination can be made as to whether a black sun spot is present.

Figure 2:
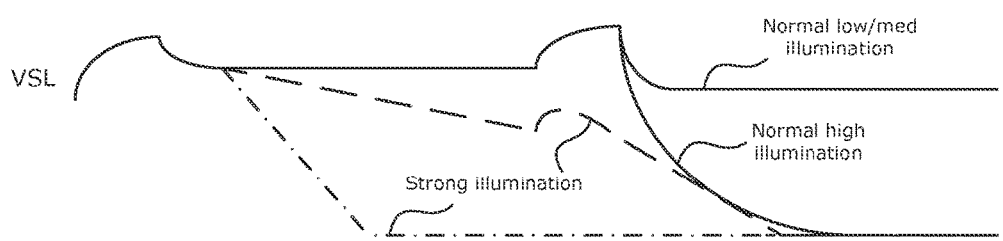
FIG. 2 illustrates exemplary timing phases and VSL waveform for a pixel circuit according to FIG. 1.
Figure 8:
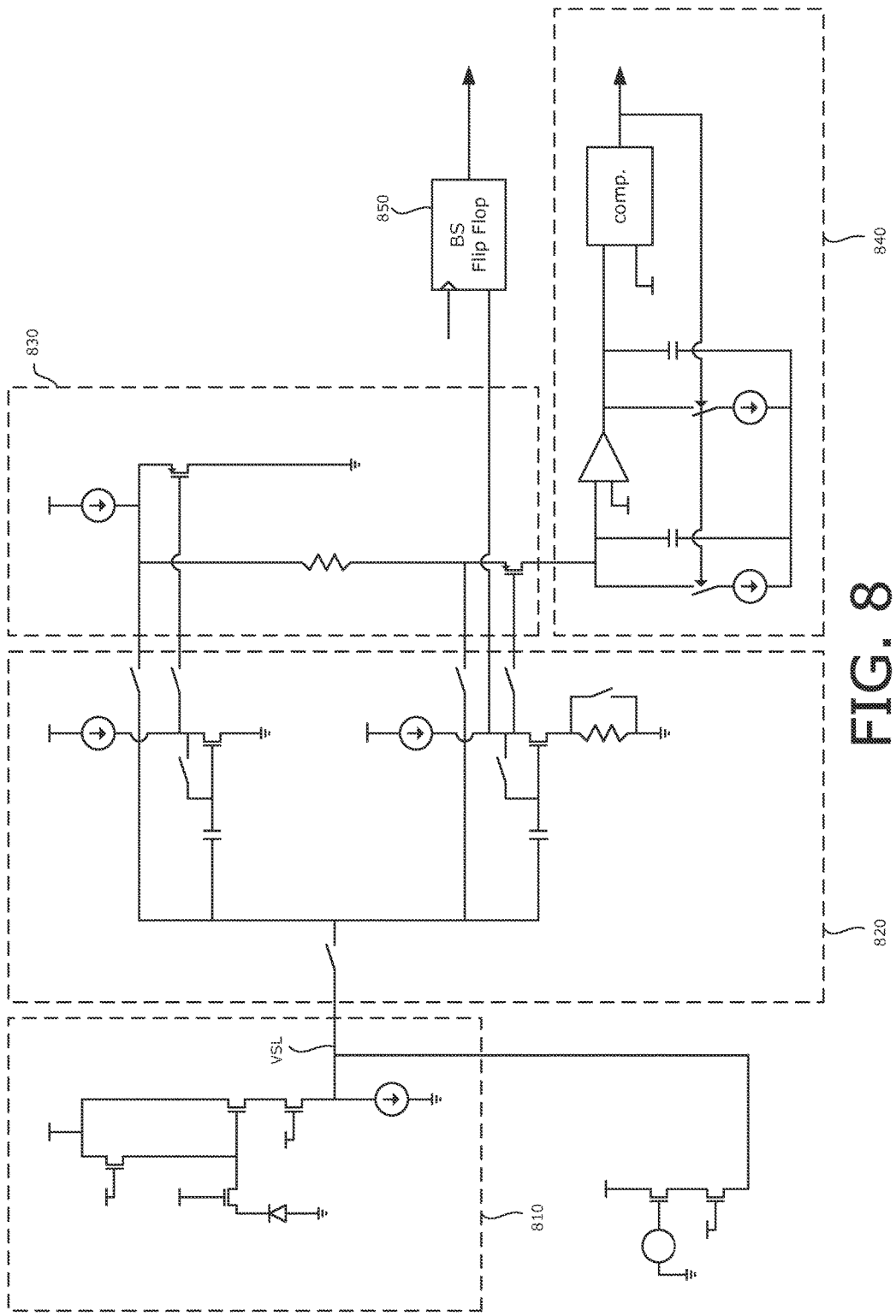
FIG. 8 illustrates another implementation of the exemplary dual S/H circuit according to FIG. 6 including a black sun detection circuit.

FIG. 8 illustrates an implementation of the circuit block diagram illustrated in FIG. 7. For ease of illustration, FIG. 8 only shows a single pixel in pixel array 810, although in practical implementations this pixel is one of up to tens of millions or more. Thus, FIG. 8 represents an implementation of dual S/H circuit 700 with trip point control as illustrated in FIGS. 5A-C, and clamping as illustrated in FIG. 2. A full description of circuit components previously described above with respect to FIGS. 2, 5A-C, and 7 is not repeated here, for convenience.

In FIG. 8, the pixel in array 810 outputs a pixel signal as a voltage VSL on a vertical signal line, which is clamped as described above. This signal is output to a pair of transistor S/H circuits 820, one of which implements trip point shifting as also described above. The output of the trip-point-shifted S/H circuit is latched by a black sun spot flip flop 850. When the output of flip flop 850 is 1, this indicates that strong illumination is present and informs the digital logic to set the output pixel value to the maximum output value.

The two S/H transistor circuits 820 are connected to V2I circuit 830, which comprises a current source having current $I_1$ and a resistor having resistance $R_1$ as described above. The resistor is connected across the two S/H outputs, and as a result the current in the resistor $(I_R)$ is given by the difference between the sampled reset signal and the sampled data signal, divided by $R_1$. That is, $I_R=(V_{reset}-V_{data})/R_1$.

As illustrated in FIG. 8, the current $I_1$ is split between the resistor and a source-follower PMOS transistor that connects to ground, just as in the implementation of FIG. 7. Thus, where the current flowing through the resistor is $I_R$, the current flowing through the grounding transistor is $I_1-I_R$. Therefore, to ensure proper circuit operation, the value of current source $I_1$ is chosen so that the value $I_1$ is larger than the maximum possible value of $(V_{reset}-V_{data})/R_1$ for any $V_{reset}$ and $V_{data}$ values.

Current $I_R$ is fed via another source-follower PMOS transistor to ADC 840, which is preferably a current mode sigma-delta ADC. Thus, ADC 840 sees an input current $(V_{reset}-V_{data})/R_1$. As described above with regard to FIG. 7, both CDS subtraction and analog gain capabilities are therefore built in to this circuit. The output of ADC 840 is a digital value corresponding to $(V_{reset}-V_{data})/R_1$.

ADC 840 is not restricted to a current mode sigma-delta ADC, but may be any type of analog-to-digital converter. For example, ADC 840 may be a single slope ADC, a flash ADC, a sigma-delta ADC, a successive approximation ADC, and the like. It is preferable to use a sigma-delta ADC for ADC 840, because a sigma-delta ADC operates using over-sampling where each conversion is the result of many high speed samples. The output from a sigma-delta ADC may be passed through a decimation filter to generate the final digital output. As a result, ADC 840 will have an inherent low-pass filtering characteristic which helps reduce the sampling amplifiers and resistor noise.

Figure 9:
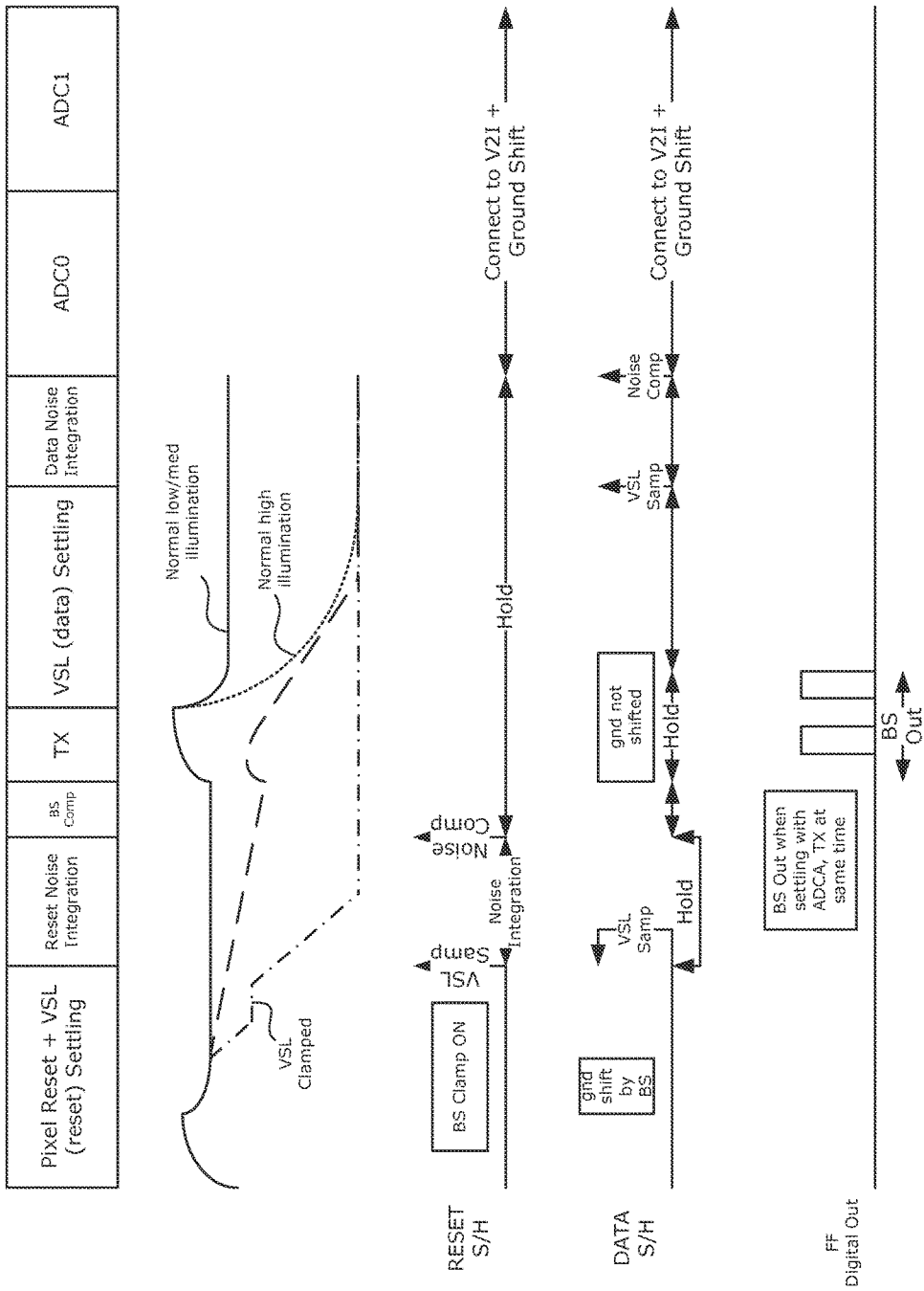
FIG. 9 illustrates an exemplary timing of a black sun detection circuit according to various aspects of the present disclosure.

FIG. 9 illustrates a timing diagram of the operation of a black sun spot detection circuit. The clamping circuit described above is turned on during the timing labeled "BS Clamp On" in FIG. 9. This prevents the waveform of signal VSL from dropping below a predetermined voltage. At the end of this period (that is, the beginning of the reset noise integration period) the S/H circuit on the reset side of the two S/H circuits 820 is used to sample the initial VSL signal. After that, the switch for shifting the trip point is turned on and the S/H output is read to determine whether the change in VSL signal has exceeded a threshold; for example by flip flop 850. If that is the case, then a black sun spot caused by strong illumination is detected and flagged for the pixel. This information is passed to the ADC output so that the output can be set to the maximum value. As a result, this circuit prevents a black or gray spot when the illumination has exceeded the normal operating range.

[Imaging Device]

Figure 1:
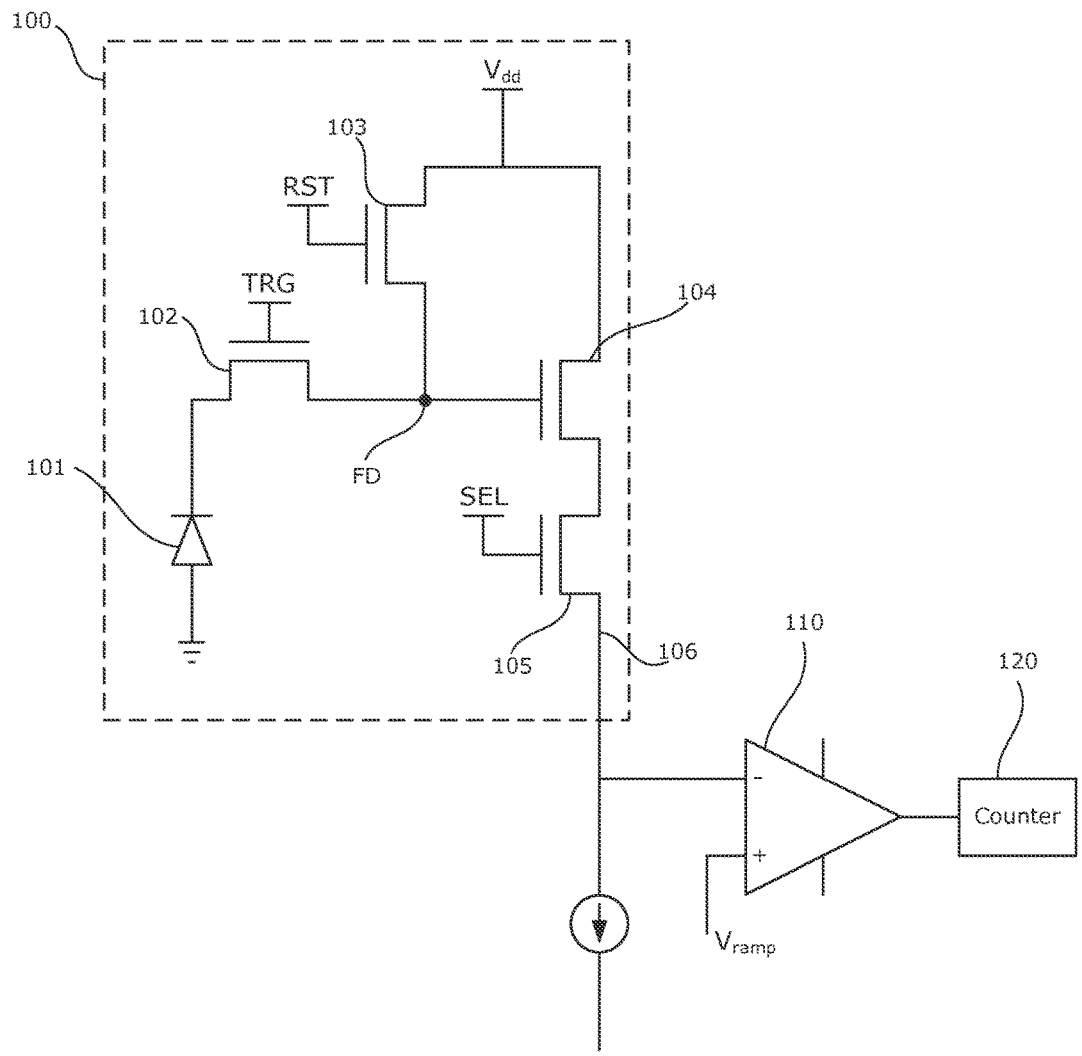
FIG. 1 illustrates an exemplary pixel circuit with single-slope ADC for use with various aspects of the present disclosure.
Figure 10:
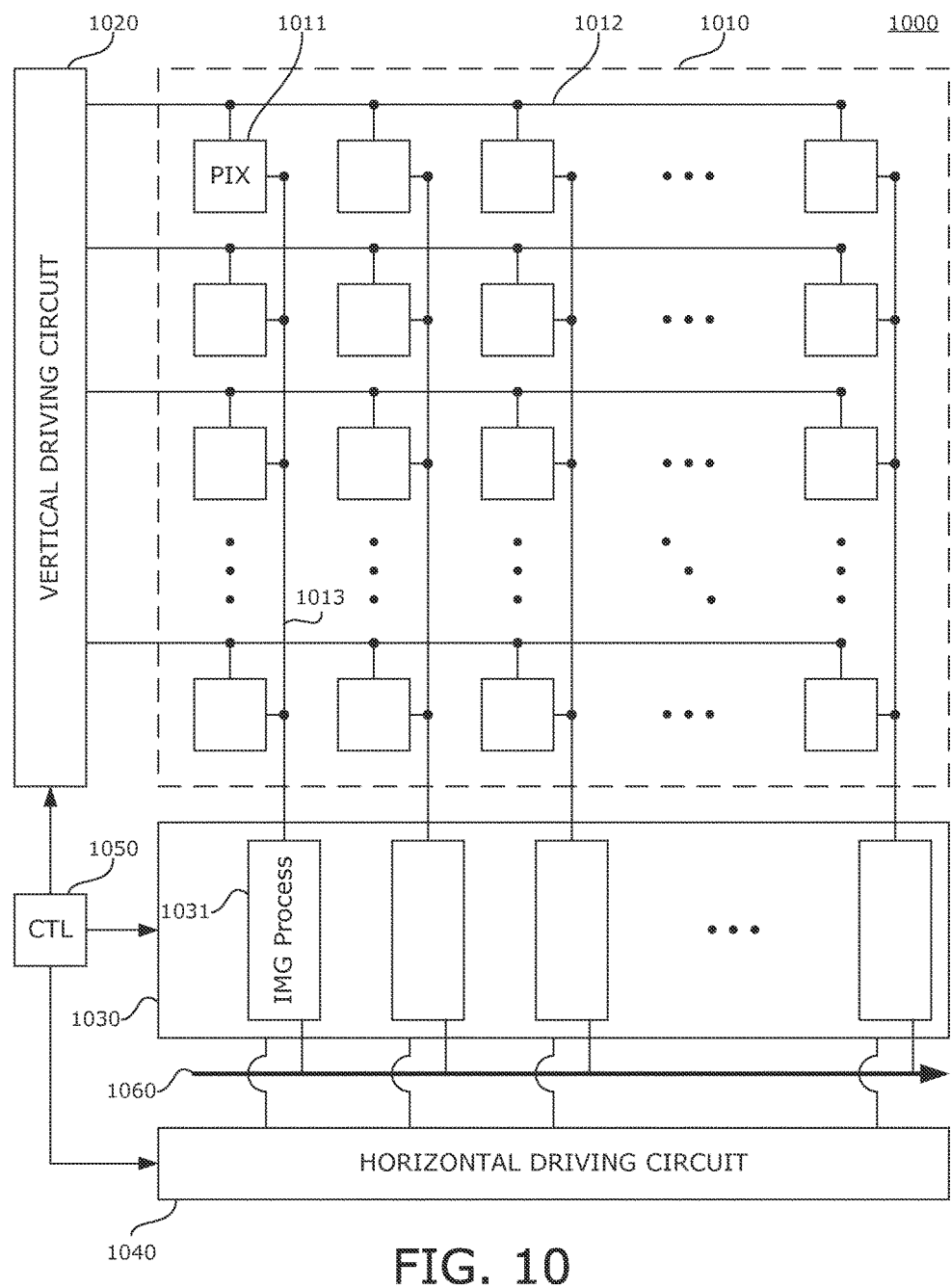
FIG. 10 illustrates an exemplary imaging device according to various aspects of the present disclosure.

FIG. 10 illustrates an image sensor 1000 that includes an image processing circuit, such as an image processing circuit as described above. Image sensor includes an array 1010 of pixels 1011 (for example, pixels as illustrated in FIG. 1). Pixels 1011 are located at intersections where horizontal signal lines 1012 and vertical signal lines 1013 cross one another. Horizontal signal lines 1012 are operatively connected to a vertical driving circuit 1020, also known as a "row scanning circuit," at a point outside of the pixel array, and carry signals from vertical driving circuit 1020 to a particular row of pixels 1011. Pixels in a particular column output an analog signal corresponding to an amount of incident light to vertical signal line 1013. For illustration purposes, only a small number of pixels 1011 are actually shown in FIG. 10; however, in practice image sensor 1000 may have up to tens of millions of pixels ("megapixels" or MP) or more.

Vertical signal line 1013 conducts the analog signal for a particular column to a column circuit 1030. While FIG. 10 illustrates one vertical signal line 1013 for each column in pixel array 1010, the present disclosure is not so limited. For example, more than one vertical signal line 1013 may be provided for each column, or each vertical signal line 1013 may correspond to more than on column. In any case, column circuit 1030 preferably includes a plurality of individual image processing circuits 1031. As illustrated, the ADC circuit includes a image processing circuit 1031 for each vertical signal line 1013; however, each image processing circuit may correspond to more than one vertical signal line 1013.

Column circuit 1030 is controlled by a horizontal driving circuit 1040, also known as a "column scanning circuit." Each of vertical driving circuit 1020, column circuit 1030, and horizontal driving circuit 1040 receive one or more clock signals from a controller 1050. Controller 1050 controls the timing and operation of various image sensor components such that analog signals from pixel array 1010, having been converted to digital signals in column circuit 1030, are output via output circuit 1060 for signal processing, storage, transmission, and the like.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An image processing circuit, comprising:
   a first sample-and-hold circuit configured to sample a first data from a pixel;
   a second sample-and-hold circuit configured to sample a second data from the pixel;
   a voltage-to-current circuit including a first resistor and a current source, and configured to receive the first data and the second data and output a difference data to a current-mode analog-to-digital converter; and
   a black sun spot determination circuit configured to compare a first voltage from the second sample-and-hold circuit at a first time with a second voltage from the second sample-and-hold circuit at a second time and determine a presence of a black sun spot based on a difference between the first voltage and the second voltage,
   wherein the black sun spot determination circuit includes a comparator with an offset value selectively added at a time of the comparison using a second resistor and a switch connected in parallel.

2. The image processing circuit according to claim 1, wherein the comparison is performed after an auto zero operation of the comparator.

3. The image processing circuit according to claim 1, wherein the analog-to-digital converter configured is to receive the difference data and convert the difference data to a digital signal.

4. The image processing circuit according to claim 3, wherein
   in a case where the black sun spot determination circuit determines that the black sun spot is not present, the image processing circuit is configured to output the digital signal as an output signal, and
   in a case where the black sun spot determination circuit determines that the black sun spot is present, the image processing circuit is configured to output a predetermined override signal as the output signal.

5. The image processing circuit according to claim 1, wherein the black sun spot determination circuit is configured to determine that the black sun spot is present if the difference exceeds a predetermined threshold.

6. The image processing circuit according to claim 1, further comprising a clamping circuit configured to selectively clamp a vertical signal line connected to the pixel.

7. A method of processing an image, comprising:
   sampling a first data from a pixel by a first sample-and-hold circuit;
   sampling a second data from the pixel by a second sample-and-hold circuit;
   receiving the first data and the second data by a voltage-to-current circuit including a first resistor and a current source;
   outputting a difference data to a current-mode analog-to-digital converter by the voltage-to-current circuit;
   comparing a first voltage from the second sample-and-hold circuit at a first time with a second voltage from the second-sample-and hold circuit at a second time by a black sun spot determination circuit; and
   determining a presence of a black sun spot based on a difference between the first voltage and the second voltage,
   wherein the black sun spot determination circuit includes a comparator with an offset value selectively added at a time of the comparison using a second resistor and a switch connected in parallel.

8. The method according to claim 7, further comprising performing an auto zero operation of the comparator before the comparing.

9. The method according to claim 7, further comprising:
   receiving the difference data by the analog-to-digital converter; and
   converting the difference data to a digital signal by the analog-to-digital converter.

10. The method according to claim 9, further comprising:
    in a case where the black sun spot determination circuit determines that the black sun spot is not present, outputting the digital signal as an output signal, and
    in a case where the black sun spot determination circuit determines that the black sun spot is present, outputting a predetermined override signal as the output signal.

11. The method according to claim 7, wherein the determining includes determining that the black sun spot is present if the difference exceeds a predetermined threshold.

12. The method according to claim 7, further comprising selectively clamping a vertical signal line connected to the pixel by a clamping circuit.

13. An imaging device, comprising:
   a pixel including a photoelectric conversion device configured to convert an incident light into an analog signal; and
   an image processing circuit, including:
      a first sample-and-hold circuit configured to sample a first data from the pixel;
      a second sample-and-hold circuit configured to sample a second data from the pixel;
      a voltage-to-current circuit including a first resistor and a current source, and configured to receive the first data and the second data and output a difference data to a current-mode analog-to-digital converter; and
      a black sun spot determination circuit configured to compare a first voltage from the second sample-and-hold circuit at a first time with a second voltage from the second sample-and-hold circuit at a second time and determine a presence of a black sun spot based on a difference between the first voltage and the second voltage, wherein
         the black sun spot determination circuit includes a comparator with an offset value selectively added at a time of the comparison using a second resistor and a switch connected in parallel.

14. The imaging device according to claim 13, wherein the comparison is performed after an auto zero operation of the comparator.

15. The imaging device according to claim 13, wherein the analog-to-digital converter is configured to receive the difference data and convert the difference data to a digital signal.

16. The imaging device according to claim 15, wherein
   in a case where the black sun spot determination circuit determines that the black sun spot is not present, the image processing circuit is configured to output the digital signal as an output signal, and
   in a case where the black sun spot determination circuit determines that the black sun spot is present, the image processing circuit is configured to output a predetermined override signal as the output signal.

17. The imaging device according to claim 13, further comprising a clamping circuit configured to selectively clamp a vertical signal line connected to the pixel.

* * * * *